United States Patent
Carlhoff et al.

(10) Patent No.: US 11,618,398 B2
(45) Date of Patent: Apr. 4, 2023

(54) CONTROL OF VEHICLE FUNCTIONS

(71) Applicant: Ford Global Technologies, LLC, Dearborn, MI (US)

(72) Inventors: Philipp Carlhoff, Herzogenrath (DE); Roman Atilla Koch, Aachen (DE); Yuliya Aksyutina, Jülich (DE); Monika Angst, Aachen (DE); Rainer Busch, Aachen (DE); Cem Mengi, Aachen (DE); Kai Skolik, Würselen (DE)

(73) Assignee: Ford Global Technologies, LLC, Dearborn, MI (US)

(*) Notice: Subject to any disclaimer, the term of this patent is extended or adjusted under 35 U.S.C. 154(b) by 91 days.

(21) Appl. No.: 17/209,459

(22) Filed: Mar. 23, 2021

(65) Prior Publication Data

US 2021/0309235 A1     Oct. 7, 2021

(30) Foreign Application Priority Data

Apr. 3, 2020  (DE) .......................... 102020109360.8

(51) Int. Cl.
*B60W 50/00*  (2006.01)
*B60R 16/037* (2006.01)
*B60W 50/14*  (2020.01)
*B60R 16/023* (2006.01)

(52) U.S. Cl.
CPC ........ *B60R 16/037* (2013.01); *B60R 16/0373* (2013.01); *B60W 50/0098* (2013.01); *B60W 50/14* (2013.01); *B60R 16/0231* (2013.01)

(58) Field of Classification Search
None
See application file for complete search history.

(56) References Cited

U.S. PATENT DOCUMENTS

| | | | |
|---|---|---|---|
| 9,739,226 B2 * | 8/2017 | Elwart | B60W 30/06 |
| 10,407,008 B2 * | 9/2019 | Bonnet | B62D 15/0285 |
| 11,183,066 B2 | 11/2021 | Sohn | |

(Continued)

FOREIGN PATENT DOCUMENTS

| | | | | |
|---|---|---|---|---|
| CN | 202448964 U | * | 9/2012 | |
| CN | 103761462 A | * | 4/2014 | B60R 25/257 |

(Continued)

OTHER PUBLICATIONS

Non-Final Office Action for U.S. Appl. No. 17/208,218 as issued by the USPTO dated Nov. 10, 2022.

*Primary Examiner* — Kevin R Steckbauer
(74) *Attorney, Agent, or Firm* — Brandon Hicks; Bejin Bieneman PLC (57) ABSTRACT

A system and/or method include receiving vehicle function sequence schemas, which specify a sequence of vehicle functions in the presence of a triggering event linked to the particular vehicle function sequence schema, checking the received vehicle function sequence schemas, storing the checked vehicle function sequence schemas, and checking the presence of a triggering event, selecting a stored vehicle function sequence schema linked to the present triggering event, generating control signals for controlling vehicle function devices according to the selected vehicle function sequence schema, and outputting the generated control signals to the vehicle function devices.

13 Claims, 4 Drawing Sheets

(56) References Cited

U.S. PATENT DOCUMENTS

| | | |
|---|---|---|
| 11,300,090 B2 | 4/2022 | Dixon et al. |
| 11,377,071 B2 | 7/2022 | Wall et al. |
| 11,451,384 B2 | 9/2022 | Darnell et al. |
| 2009/0146846 A1 | 6/2009 | Grossman |
| 2015/0015386 A1 | 1/2015 | Langenhan |
| 2015/0203062 A1 | 7/2015 | Gautama et al. |
| 2015/0226146 A1* | 8/2015 | Elwart ............... F02N 11/0818 701/112 |
| 2017/0061800 A1* | 3/2017 | Davis .................... G07B 15/00 |
| 2017/0334380 A1* | 11/2017 | Bonnet ............. B60H 1/00778 |
| 2018/0082142 A1 | 3/2018 | Han et al. |
| 2018/0194344 A1* | 7/2018 | Wang .................. G05D 1/0088 |
| 2019/0299929 A1 | 10/2019 | Neuhoff |
| 2019/0375404 A1 | 12/2019 | Maleki |
| 2020/0064847 A1 | 2/2020 | Zhang et al. |
| 2021/0053515 A1* | 2/2021 | Dombrovskis .... B60H 1/00771 |
| 2021/0309235 A1* | 10/2021 | Carlhoff ........... B60W 50/0098 |
| 2021/0309245 A1* | 10/2021 | Carlhoff ........... B60W 50/0098 |
| 2022/0274588 A1* | 9/2022 | Marek ................ G01C 21/3476 |

FOREIGN PATENT DOCUMENTS

| | | | | |
|---|---|---|---|---|
| CN | 104827989 A | * | 8/2015 | ............. B60K 28/04 |
| CN | 103761462 B | * | 10/2016 | ........... B60R 25/257 |
| CN | 103761462 B | | 10/2016 | |
| CN | 106515619 A | * | 3/2017 | ............. G07B 15/00 |
| CN | 107178237 A | * | 9/2017 | |
| CN | 111661039 A | * | 9/2020 | ........... B60W 30/06 |
| CN | 113492777 A | * | 10/2021 | ......... B60R 16/0373 |
| CN | 113492781 A | * | 10/2021 | ......... B60W 50/085 |
| CN | 104827989 B | * | 1/2022 | ............. B60K 28/04 |
| CN | 114126954 A | * | 3/2022 | ........... B60W 30/06 |
| DE | 19839355 C1 | * | 4/2000 | ........... B60R 25/245 |
| DE | 102008005621 A1 | * | 7/2009 | ........... B60Q 3/0293 |
| DE | 102015002204 A1 | * | 8/2015 | ............. G07B 15/02 |
| DE | 102015011498 A1 | * | 3/2016 | ............. B60W 50/00 |
| DE | 102014018189 A1 | * | 6/2016 | ........ B60H 1/00778 |
| DE | 102019211681 A1 | * | 2/2021 | ........... B60W 30/06 |
| DE | 102019211681 B4 | * | 7/2021 | ........... B60W 30/06 |
| DE | 102020109360 A1 | * | 10/2021 | ......... B60R 16/0373 |
| DE | 102020109379 A1 | * | 10/2021 | ......... B60W 50/085 |
| EP | 3109801 A1 | | 12/2016 | |
| EP | 3569464 A1 | | 11/2019 | |
| EP | 3569464 A1 | * | 11/2019 | ........ B60H 1/00742 |
| GB | 2523898 A | * | 9/2015 | ............. B60K 28/04 |
| GB | 2528703 A | | 2/2016 | |
| JP | 2000118354 A | * | 4/2000 | ........... B60R 25/245 |
| JP | 3250074 B2 | | 1/2002 | ........... B60R 25/245 |
| JP | 2004227145 A | * | 8/2004 | ........... B60R 25/042 |
| JP | 3651314 B2 | * | 5/2005 | |
| JP | 2006069231 A | * | 3/2006 | |
| JP | 3851413 B2 | * | 11/2006 | |
| JP | 4035719 B2 | * | 1/2008 | ........... B60R 25/042 |
| JP | 4119108 B2 | * | 7/2008 | |
| JP | 4146094 B2 | * | 9/2008 | |
| RU | 2015103983 A | * | 8/2016 | ............. B60K 28/04 |
| WO | 2013174788 A1 | | 11/2013 | |
| WO | 2017218188 A1 | | 12/2017 | |
| WO | WO-2021023420 A1 | * | 2/2021 | ........... B60W 30/06 |
| WO | WO-2022175475 A1 | * | 8/2022 | ........... B60W 30/06 |

* cited by examiner

CONTROL OF VEHICLE FUNCTIONS

CROSS-REFERENCE TO RELATED APPLICATIONS

This patent application claims priority to German Application No. 102020109360.8, filed Apr. 3, 2020, which is hereby incorporated herein by its reference in its entirety.

BACKGROUND

Many driving situations require that the driver or another user of a vehicle repeatedly activate and/or deactivate certain vehicle functions. An example thereof is a delivery driver or courier, who must carry out multiple vehicle functions, partly in a certain order, when he/she stops the vehicle in order to deliver a package. These can include, for example: Shutting off the vehicle engine, closing the windows, shifting into the "Park" gear position, activating the parking brake, switching off the ignition, opening doors, locking the vehicle, etc. Considered throughout an entire work day, it may be necessary to repeat these actions more than one hundred times.

In general, vehicle functions already exist that are carried out in an at least partially automated manner under certain conditions. An example thereof is the automatic shift into the "Park" gear position as soon as the vehicle door is opened in the case of an automatic transmission. Such triggering events, which are also referred to as triggers, and the processes triggered as a result are predefined, however, and cannot be adapted to the individual requirements.

In addition, certain vehicle functions or a certain sequence of vehicle functions cannot be linked to triggering events, for example, switching off the air conditioning system and increasing the radio volume when the convertible top or sliding roof is opened. Frequently, only a single vehicle function based on a single triggering event is carried out or a complex of vehicle functions is carried out, which, however, is fixedly predefined by the manufacturer of the vehicle.

Against the background of constantly increasing vehicle functions, this means either an increase of the actions to be carried out by the driver or the user of the vehicle or an inefficient utilization of the available vehicle functions. This can result in the driver or user becoming irritated due to numerous repetitive actions.

CN 103761462 A describes, for example, a method for personalizing vehicle settings, in which the setting of the seat position and the rearview mirror is linked to the voice of the driver and stored. When the driver's voice is recognized, the appropriate settings are automatically implemented, and so a manual adjustment is not required. This method is limited to a specific vehicle and mutually independent vehicle functions, however. In addition, the settings to be stored must first be actually carried out, i.e., the setting of the seat position and rearview mirror desired at least once is required.

WO 2013/174788 A1 describes a device for the event-controlled, automatic activation and/or deactivation and/or setting of at least one vehicle function system, for example, a seat heater, a radio, etc. The device includes a user interface, with which the vehicle user can predefine a rule, which includes at least one condition for a selectable input variable and which sets a selectable vehicle function system in relation to the selectable input variable in each case. This makes it possible to carry out a vehicle function in an automated manner on the basis of the rules predefinable by the vehicle user. Optionally, a series of vehicle functions can also be linked to a rule. A check of the predefinable input variables, conditions, and the vehicle functions linked thereto does not take place, however, and so the reliability of the system is not ensured. In addition, the specification of the rules requires specific knowledge of the processes taking place, since all conditions must be defined by the vehicle user him/herself.

US 2015/0203062 A1 discloses methods and systems for generating user profiles for a vehicle and a method for managing such a user profile. Data for displaying a selection screen of a graphical user interface are generated in the vehicle. Thereafter, profile personalization data are received and, on the basis of these data, a user profile is generated, which is stored. In addition, an identification of the user is provided. In this method as well, however, a check of the user profiles with respect to their functional capability is not provided.

In EP 3569464 A1, a method is described that temporarily changes a characteristic of a vehicle feature depending on an emotional state of the vehicle user. A setting of vehicle function sequences that is permanent and actively configured by the vehicle user is not provided.

SUMMARY

Disclosed herein are systems and methods to allow a plurality of vehicle functions to run in an automated manner and to provide for individualization for users. Specifying conditions to be linked to the vehicle functions is provided for in an efficient manner. Further advantageously, it is possible to ensure the functional capability of predefinable sequence schemas.

A system for automating vehicle functions includes a receiving unit, which includes means for receiving vehicle function sequence schemas, which specify a sequence of vehicle functions in the presence of a triggering event linked to the particular vehicle function sequence schema.

A vehicle can be understood to be any mobile means of transportation, i.e., a ground vehicle as well as watercraft or aircraft, for example, a passenger car or a truck.

Vehicle functions can be understood to be functions that the vehicle can carry out automatically, i.e., without intervention of the driver or the vehicle user, such as, for example, opening/closing vehicle openings such as doors, windows, sliding roofs, etc., switching the ignition on/off, unlocking/locking the vehicle, switching the air conditioning system on/off, decreasing/increasing the volume and other settings of an infotainment system, shifting into a certain gear position, activating/deactivating the parking brake, activating/deactivating driver assistance systems, setting a certain seat position, switching an illumination on/off, representing certain content in a display device, transmitting predefinable data to a computer cloud, etc. The vehicle functions are carried out by means of appropriate vehicle function devices.

The vehicle function sequence schema defines a time sequence with which the vehicle functions can be carried out. In other words, a chronological order is defined, wherein some vehicle functions can be carried out temporally in parallel, temporally offset with respect to one another, or temporally one after the other. In addition to a time sequence, a vehicle function sequence schema can also include conditions, loops, and user-defined subprograms. The vehicle function sequence schema can be defined by a user, wherein the user can be, for example, a vehicle driver, a vehicle owner, a service technician, a fleet manager, or any other authorized person.

A triggering event is linked to each vehicle function sequence schema, upon the occurrence of which the associated sequence is initiated. A triggering event can also be linked to multiple vehicle function sequence schemas and, consequently, initiate the execution of multiple vehicle function sequence schemas.

In a simple case, the triggering event can be the actuation of a pushbutton or a switch. Further triggering events can be based on voice input, i.e., the triggering event is the reception of a certain spoken word, a group of words, a sentence, etc. It is also possible that the triggering event is the arrival at a certain geographic position or a certain geographic area, which can be detected, for example, by means of a global navigation satellite system.

Further triggering events can be:
  the activation of a screen element of a human-machine interface,
  the occurrence of a certain environmental condition, for example, ambient temperature, rain, sunshine, etc.,
  the elapse of a certain time period, the reaching of a certain point in time (time of day and/or date),
  the detection of a certain vehicle property, for example, vehicle speed, state of charge of the battery, ignition status, opening or closing a vehicle opening, for example, a vehicle door or a trunk lid,
  the detection of a certain route or a certain route property, for example, an expressway, off-road driving, low road grip,
  an input into a V2X communication system, for example, a smart home device, a traffic regulation device, such as, for example, a light signal system, a communication system of another vehicle,
  a communication with a connected mobile terminal, for example, a smartphone or tablet, for example, in the form of an incoming message or a notification of an application.

In order to detect the occurrence of a triggering event, one or multiple input variables can be monitored, for example, vehicle speed, point in time, temperature, atmospheric humidity, etc. Appropriately designed sensors can be utilized for this purpose. These input variables are user-independent, i.e., their value is not directly affected by the user. Therefore, a fully automatic execution of the vehicle function sequence schemas is made possible. In addition, it can also be possible to provide user-dependent input variables, for example, a position of a pushbutton or a switch, which is actuatable by the user.

In a simple example, an input value of an input variable is ascertained and compared to a threshold value. For example, the current ambient temperature can be measured and compared to a maximum or minimum temperature. If the threshold value is reached, exceeded, or fallen below, this represents the occurrence of the triggering event and the vehicle function schema linked to the triggering event is carried out.

In further examples, input values of multiple input variables are ascertained and compared to relevant threshold values. The triggering event can be considered to have occurred for the case in which a certain definable combination of threshold values is reached, exceeded, or fallen below. In addition, further conditions can be checked, the fulfillment of which is a precondition for the occurrence of the triggering event. For example, as a basic precondition, it can be provided that the vehicle engine is in a switched-on state.

The means for receiving the vehicle function sequence schemas can be designed to be wireless or hard-wired, i.e., the receiving unit can be designed for receiving vehicle function sequence schemas in a wireless or hard-wired manner. For example, the receiving unit can be coupleable, for signal transmission, to a user interface including means for predefining vehicle function sequence schemas and, thereby, linked triggering events.

The system for automating vehicle functions also includes a checking unit, which includes means for checking the received vehicle function sequence schemas. For this purpose, an operative connection for signal transmission is formable between the receiving unit and the checking unit.

By means of the testing unit, the received vehicle function sequence schemas can be analyzed and, if necessary, the result of the analysis can be output, for example, to the user. The check can include a check of the syntax of the vehicle function sequence schemas and/or a compatibility check of the vehicle function sequence schemas with one another. In this way, the execution of one vehicle function sequence schema can be prevented from impeding the execution of a further vehicle function sequence schema.

The vehicle function sequence schemas can also be checked, for example, with respect to compliance with statutory provisions, for example, country-specific provisions, vehicle-specific conditions, for example, the presence or absence of certain hardware, and/or centrally predefinable determining factors, which are predefinable, for example, by a fleet manager, in order to achieve a certain driving behavior or to prevent an improper or critical behavior.

The checking unit advantageously allows for a check of the vehicle function sequence schemas, and so faulty vehicle function sequence schemas can be detected. Malfunctions due to faulty vehicle function sequence schemas can be avoided. This can contribute, on the one hand, to an increase of the safety and, on the other hand, to improved comfort.

The system for automating vehicle functions also includes a memory unit with means for storing the checked vehicle function sequence schemas. The storage can take place, for example, by means of a medium suitable for storage, for example, a non-volatile memory, a DVD, a USB stick, a flashcard, or the like. The memory unit can be part of a control device, for example, an engine control, or integrated into a control device and situated in the vehicle. Alternatively, the memory unit can be situated outside the vehicle, for example, in a computer cloud.

In addition, the system includes a control unit, which includes means for checking the presence of a triggering event, selecting a stored vehicle function sequence schema linked to the present triggering event, generating control signals for controlling vehicle function units according to the selected vehicle function sequence schema, and outputting the generated control signals to the vehicle function units.

In other words, the control unit is responsible for carrying out a vehicle function sequence schema if the triggering event linked thereto is present, generating the control signals connected thereto, and outputting these to the vehicle function units. In order to be able to fulfill these functions, the control unit is operatively connected, for signal transmission, to the memory unit, sensors for detecting a triggering event, and vehicle function units.

The control unit can receive sensor signals, for example, from sensors for monitoring the input variables, and process these sensor signals based on instructions or a code programmed in the control unit according to one or multiple routine(s). Thereafter, the control unit transmits control signals to the vehicle function units as actuators in response to the processed sensor signals.

The control unit can be implemented in the form of hardware and/or software and can be physically designed as one or multiple part(s). The control unit can be part of an engine control or integrated therein and situated in the vehicle. Alternatively, the control unit can be situated outside the vehicle, for example, in a computer cloud.

The system overall, i.e., all units of the system, can be situated in the relevant vehicle. This advantageously enables an autonomous utilization of the system for a certain vehicle, because communication of the individual units with one another is necessary only within the vehicle.

Alternatively, one or multiple or all unit(s) of the system can be situated outside the vehicle. This allows, for example, for a utilization of the vehicle function sequence schemas by multiple vehicles. It is not necessary to equip the vehicles with the system, but rather it is sufficient when the vehicles include a receiving unit for receiving the generated control signals or the vehicle function units are appropriately designed.

The provided system makes it possible to be able to allow a plurality of vehicle functions to run in an automated manner, which are predefinable in an individualized manner in the form of sequence schemas. By checking the vehicle function sequence schemas, their functional capability can be ensured.

According to different examples, the system can include a user interface, which is coupleable to the receiving unit for signal transmission and includes means for predefining vehicle function sequence schemas and, thereby, linked triggering events.

A user interface can be understood to be an interactive system, which provides information and control elements, which are necessary for the user, in order to complete a certain work task with the interactive system. The user interface can be designed, for example, as a graphical user interface, command lines, a natural user interface, a voice user interface, and/or a character user interface.

The specification or definition of the vehicle function sequence schemas and triggering events linked thereto can take place in different ways, starting from essentially predefined sequences, which allow the user only a small amount of decision-making freedom, for example, in that only a limited selection of vehicle functions, time sequences, etc., can be selected by means of so-called drop-down menus, up to a free definition by utilizing a script language.

In addition, it can be provided that functional elements, such as, for example, if-then conditions, for loops, user-definable variables linkable to function calls, etc., are integratable into the vehicle function sequence schemas. For example, it can be provided that the user can define that certain values are used for retrieving a vehicle function. By way of example, the user can determine, at a certain point in time, that the position of the window is to be stored and, at another point in time, the windows are to be opened again. The previously stored value is transmitted, as the target value, to this function.

In one example, the user interface can be situated in the vehicle, and so vehicle function sequence schemas and triggering events linked thereto are predefinable from the vehicle, for example, by utilizing a touchscreen of an infotainment system. In this case, it can be provided that the predefined vehicle function sequence schemas and triggering events linked thereto are usable exclusively by the relevant vehicle.

In one further example, the user interface can be designed as a mobile terminal, for example, a smartphone, tablet, etc., with an appropriate application. Moreover, it is possible to utilize so-called cloud services as the user interface. The control of the system by way of the mobile terminal is not directly connected to the vehicle, for example, via Bluetooth or WLAN, but rather the communication takes place via a cloud service, for example, FordCloud or FordPass of Ford Motor Co. For example, a user can create a vehicle function sequence schema on his/her tablet. This is transmitted to the FordCloud and validated there. Thereafter, the FordCloud transmits the vehicle function sequence schema to the specific vehicle, and so the vehicle function sequence schema can be utilized by this vehicle. These examples enable the user to predefine vehicle function sequence schemas and triggering events linked thereto from outside the vehicle.

In one further example, the predefinition of vehicle function sequence schemas and triggering events linked thereto can take place via a web site. Consequently, the user interface can be designed, for example, as a personal computer.

In the latter described examples, it can be provided that the provided vehicle function sequence schemas and triggering events linked thereto are usable for multiple vehicles, for example, a vehicle fleet.

The described user interfaces allow for a simple and convenient predefinition of vehicle function sequence schemas and triggering events linked thereto.

According to further examples, the system can include a standardization unit, which includes means for standardizing vehicle function sequence schemas of different abstraction layers and/or different sources.

The standardization of the vehicle function sequence schemas can take place before or after the checking of the vehicle function sequence schemas, i.e., the vehicle function sequence schemas can be either initially checked and that standardized or initially standardized and then checked.

In addition, the standardization can also take place independently of the checking, i.e., the system in one example can also include a standardization unit instead of the checking unit.

The first variant has the advantage that only checked vehicle function sequence schemas are standardized, and so the outlay for the standardization can be kept low. The latter variant has the advantage that the check can also take place with respect to the standardization, i.e., the correct standardization can also be checked.

The standardization unit advantageously allows for the shared utilization of vehicle function sequence schemas from different sources, for example, vehicle function schemas predefined by the user and by the vehicle manufacturer, and/or abstraction layers, in that these are standardized and converted into a common low level format.

In other words, vehicle function sequence schemas from different sources can be brought into a uniform format, and so the vehicle function sequence schemas can then be processed in the same way. For example, a user utilizing the FordPass system from the automotive manufacturer Ford can situate and store a vehicle function sequence schema in a graphical user interface using drag and drop. On the other hand, an advanced user can utilize a scripting language to define a vehicle function sequence schema, in order to have more control. These different types of description can then be translated by the system and brought into a uniform, machine-readable form. The manner in which a vehicle function sequence schema was originally defined therefore does not make a difference to the control unit of the system.

According to further examples, the system can include a recording unit, which is coupleable, in a signal-transmitting manner, to the receiving unit and/or a user interface and includes means for recording a vehicle function sequence.

The recording unit makes it possible for the user to record a vehicle function sequence, for example, a sequence of manually initiated vehicle functions. In other words, by means of the recording unit, a so-called macro of a vehicle function sequence can be recorded. The recorded vehicle function sequence can be subsequently transmitted to the receiving unit and stored in the memory unit.

For this purpose, for example, the actuation of pushbuttons or switches for activating or deactivating certain properties can be detected, if necessary together with the time period of the actuation, of selected settings, selected layers, etc. Further detectable actions can be, for example, the selection of certain function lists or menus, voice input, etc.

Together with the macro, a triggering event to be linked to the macro or to the vehicle function sequence stored therein can be defined and stored. In other words, the recording unit can include means for detecting a triggering event linked to the vehicle function sequence. Here, it can be provided that the system itself suggests one or multiple triggering event(s) based on the context of the vehicle function sequence, such as, for example, the surroundings conditions, the specific driver, the vehicle condition, etc.

The recording unit can also be designed for checking, i.e., verifying, the recorded vehicle function sequence, and determining whether it is meaningful and executable. Necessary changes can be displayed to the user.

Additional options can also be available, in order to be able to connect the recorded vehicle function sequence to other functions. For example, if the vehicle user records a certain vehicle function sequence, in order to replay it again regularly, the recording unit can suggest meaningful or frequently utilized additional vehicle functions. For example, whenever the vehicle user opens the windows by way of a vehicle function sequence, it can be suggested that the radio volume is also automatically adapted. The vehicle user can then accept or reject the suggestion.

One further aspect of the disclosure relates to a method for automating vehicle functions. The method includes the following: Receiving vehicle function sequence schemas, which specify a sequence of vehicle functions in the presence of a triggering event linked to the particular vehicle function sequence schema, checking the received vehicle function sequence schemas, storing the checked vehicle function sequence schemas, checking the presence of a triggering event, in the presence of a triggering event, selecting a stored vehicle function sequence schema linked to the present triggering event, generating control signals for controlling vehicle function units according to the selected vehicle function sequence schema, and outputting the generated control signals to the vehicle function units.

The method can be suitable, for example, for carrying out the system explained above for automating vehicle functions of a vehicle. Therefore, the advantages of the system are also achieved with the method. All comments made with respect to the system apply similarly to the method.

The method can be carried out in a computer-implemented manner, i.e., at least one method step, preferably multiple or all method steps, is/are carried out by utilizing a computer program.

According to various examples, the method includes a standardization of vehicle function sequence schemas of different abstraction layers.

According to further examples, the method includes recording a vehicle function sequence.

One further aspect of the disclosure relates to a computer program, which includes commands, which prompt a system according to the above description to carry out a method according to the above description.

Therefore, the advantages of the system and of the method are also achieved with the computer program. All comments made with respect to the system and the method apply similarly to the computer program.

A computer program can be understood to be a program code storable on a suitable medium and/or retrievable via a suitable medium. In order to store the program code, any medium suitable for storing software can be utilized, for example, a non-volatile memory installed in a control device, a DVD, a USB stick, a flashcard, or the like. The retrieval of the program code can take place, for example, via the Internet or an intranet or via another suitable wireless or hard-wired network.

One further aspect of the disclosure relates to a computer-readable medium, on which the computer program is stored.

BRIEF SUMMARY OF THE DRAWINGS

The disclosure is explained in greater detail in the following with reference to the figures and the associated description. Wherein.

DESCRIPTION

Figure 1:
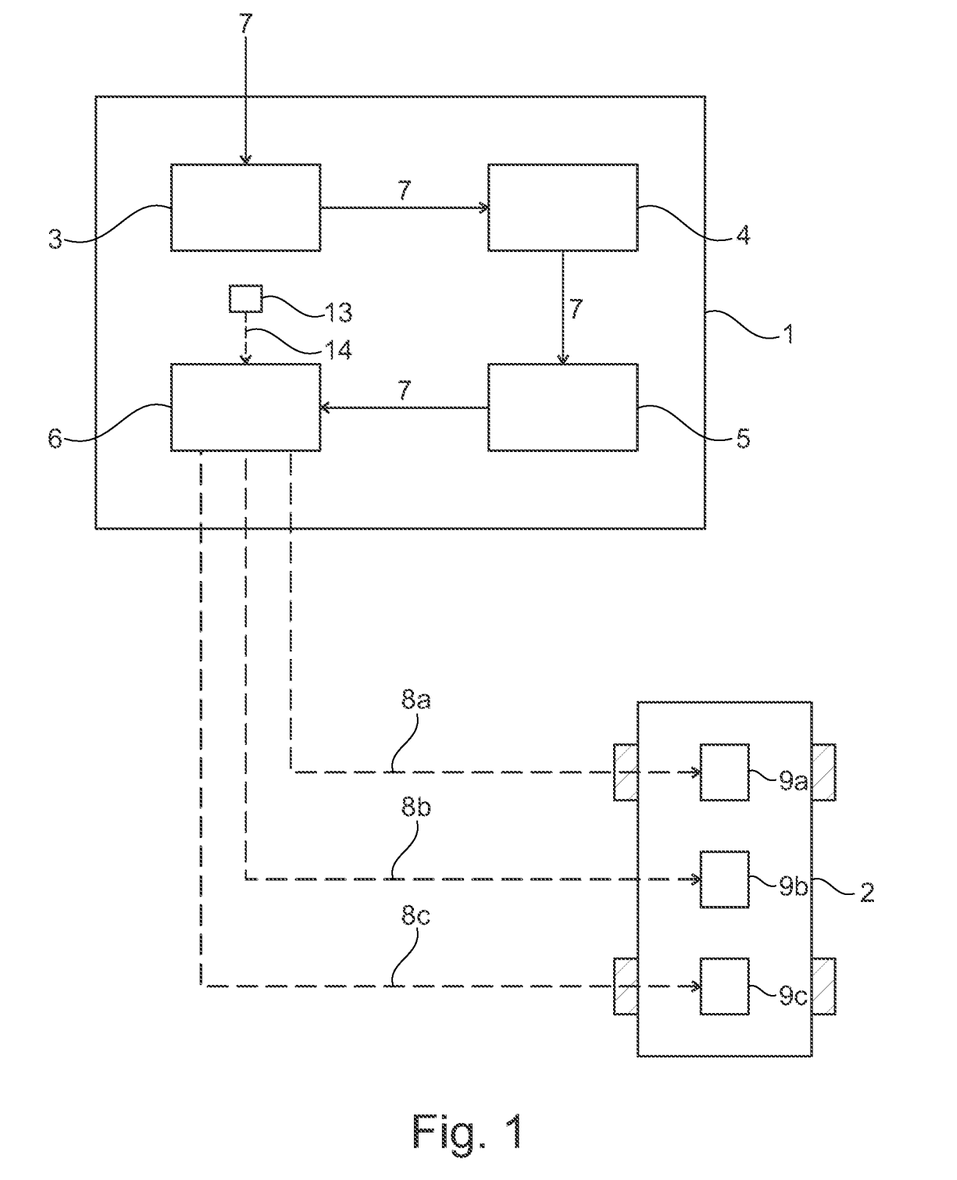
FIG. 1 shows a schematic representation of an exemplary system.

FIG. 1 shows an exemplary system 1 for automating vehicle functions of a vehicle 2. The processing of vehicle function sequence schemas 7 is represented in FIG. 1 with solid arrows.

The system 1 includes a receiving unit 3, with which so-called vehicle function sequence schemas 7 can be received. The reception can take place in a hard-wired or wireless manner, for example, by means of radio transmission. The vehicle function sequence schemas 7 specify a sequence of vehicle functions, which is carried out in the presence of a triggering event linked to this vehicle function sequence schema 7.

For example, a vehicle function sequence schema 7 can be received, in which the following vehicle functions are carried out by the appropriate vehicle function devices 9a, 9b, 9c: Shutting off the vehicle engine, closing the windows, shifting into the "Park" gear position, activating the parking brake, switching off the ignition, opening doors, locking the vehicle. Such a vehicle function sequence schema 7 can be utilized, for example, by a courier, and so the courier does not need to carry out the aforementioned processes individually and repeatedly. In this case, the triggering event can be the arrival at a certain detectable geographic position, for example, the position at which the package is to be delivered. This allows for a fully automatic execution of the vehicle function sequence schema 7, because the arrival at the geographic position can be sensed and appropriately detected by means of sensors. Alternatively, for example, the actuation of a pushbutton can be intended. The actuation of the pushbutton is the triggering event in this case.

The receiving unit 3 is coupled, for signal transmission, to a checking unit 4, and so the received vehicle function sequence schema 7 can be transmitted to the checking unit 7. The checking unit includes means for checking the received vehicle function sequence schemas 7, in order to be able to check the vehicle function sequence schema 7, for example, with respect to its functional capability and the compliance with requirements, for example, statutory provisions.

Moreover, the system 1 includes a memory unit 5, to which the checked vehicle function sequence schema 7 is transmitted and stored. A control unit 6 is also present. The control unit 6 includes means, with which the presence of the triggering event can be checked. For this purpose, the control unit 6 is in an operative connection, for signal transmission, with sensors 13, which generate sensor signals 14 and transmit these to the control unit 5. On the basis of the sensor signals 14, the control unit 5 can determine whether the triggering event is present or not.

If the control unit 5 determines that the triggering event is present, the vehicle function sequence schemas 7 linked to this triggering event are selected and the control signals 8a, 8b, 8c based on these schemas are generated. In the example represented in FIG. 1, three control signals 8a, 8b, 8c are generated and transmitted to three vehicle function units 9a, 9b, 9c, which, as actuators, carry out vehicle functions. Of course, a different number of control signals 8 can also be generated and transmitted to a different number of vehicle function units 9. The vehicle function units 9a, 9b, 9c can be, for example, a unit for closing the windows, a unit for activating the parking brake, and a unit for locking the vehicle 2.

The system 1 can be located outside the vehicle 2, although it can also be located entirely or partially in the vehicle 2.

Figure 2:
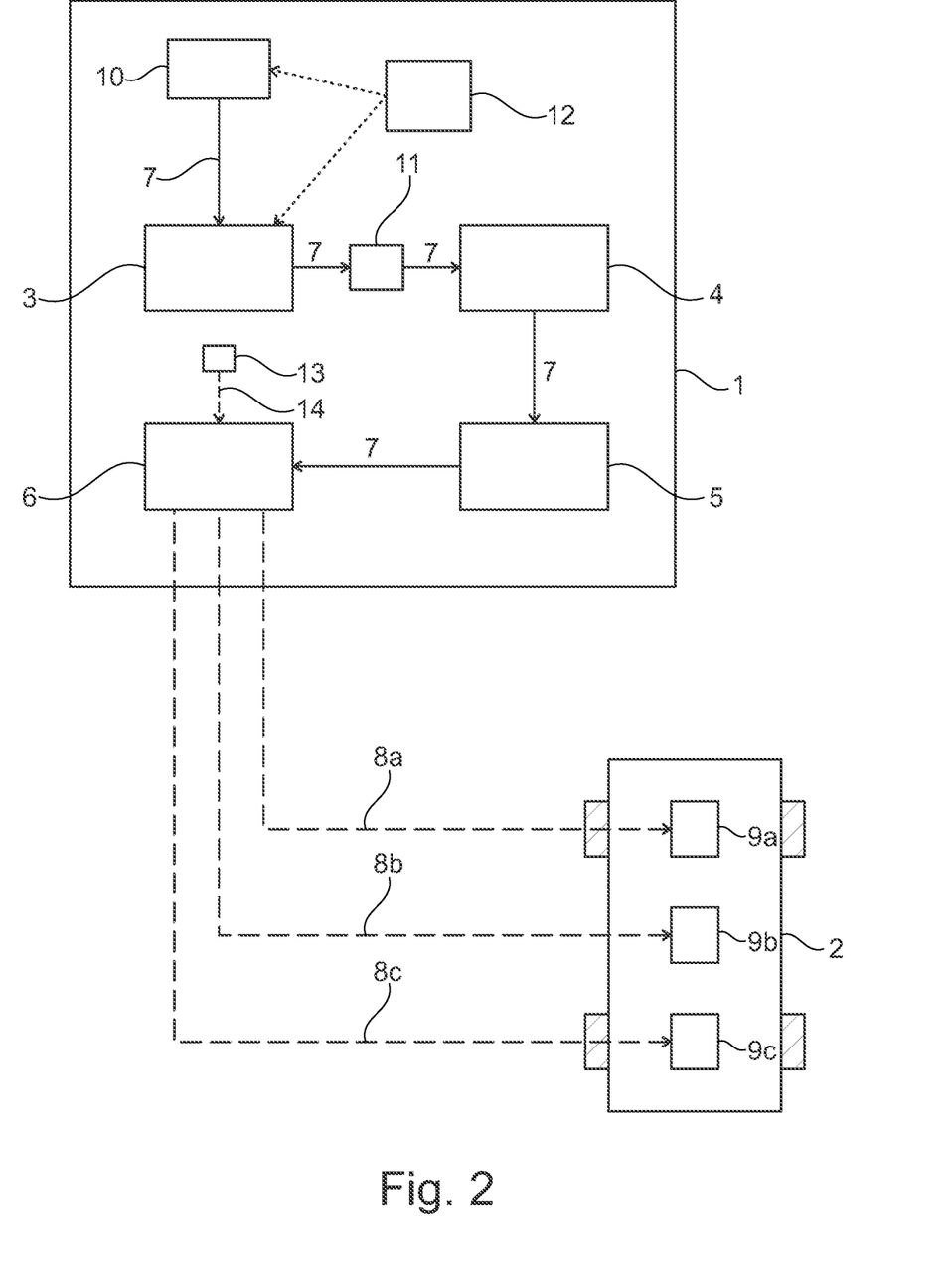
FIG. 2 shows a schematic representation of a further exemplary system.

FIG. 2 shows a further system 1 for automating vehicle functions in a schematic representation. In contrast to the system 1 from FIG. 1, a user interface 10, a standardization unit 11, and a recording unit 12 are also present, wherein only one or only two of these additional units can also be present, however.

The user interface 10 is designed as a touchscreen in the exemplary example. By means of the user interface 10, a user, for example, a driver or a fleet manager, can define a vehicle function sequence schema 7 and a triggering event linked thereto. The vehicle function sequence schema 7 defined by means of the user interface 10 is then transmitted to the receiving unit 3 and appropriately further processed.

Optionally, a recording unit 12 can be coupleable, for signal transmission, to the user interface 10 and/or the receiving unit 3. The recording unit is utilized for recording a vehicle function sequence, and so a vehicle function sequence schema 7 is generatable on the basis of this vehicle function sequence or the vehicle function sequence is integratable into a vehicle function sequence schema 7.

The standardization unit 11 is situated, with respect to signal transmission, between the receiving unit 3 and the checking unit 4. By means of the standardization unit 11, vehicle function sequence schemas 7 of different abstraction layers and/or different sources can be standardized, in order to be able to allow for a uniform further processing in the downstream systems.

Figure 3:
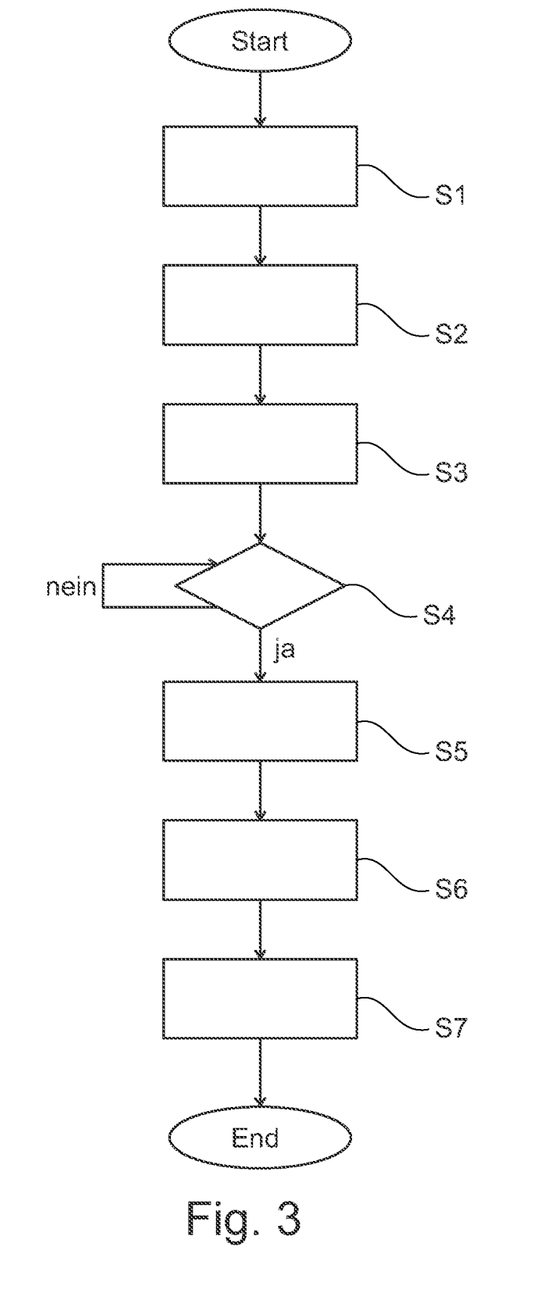
FIG. 3 shows a flow chart of an exemplary method.

An exemplary method is now explained with reference to FIG. 3, which can be carried out, for example, with the system from FIG. 1. After the start, in step S1, vehicle function sequence schemas 7 are received. The receiving unit 3 can be utilized for this purpose. In the step S2, the received vehicle function sequence schemas 7 are checked by means of the checking unit 4 and, in the subsequent step S3, stored in the memory unit 5.

In the step S4, the control unit 6 checks, on the basis of the sensor signals 14 of the sensors 13, whether a triggering event is present. If this is not the case, the step S4 is repeated, i.e., another check is carried out to determine whether a triggering event is present. If it is established in the step S4, however, that a triggering event is present, the method continues to the step S5 and a stored vehicle function sequence schema 7 linked to the triggering event is selected.

In the step S8, control signals 8 are generated according to the selected vehicle function sequence schema 7 by means of the control unit 6 and, in the step S7, output to the particular vehicle function unit 9. Therefore, the method is completed.

Figure 4:
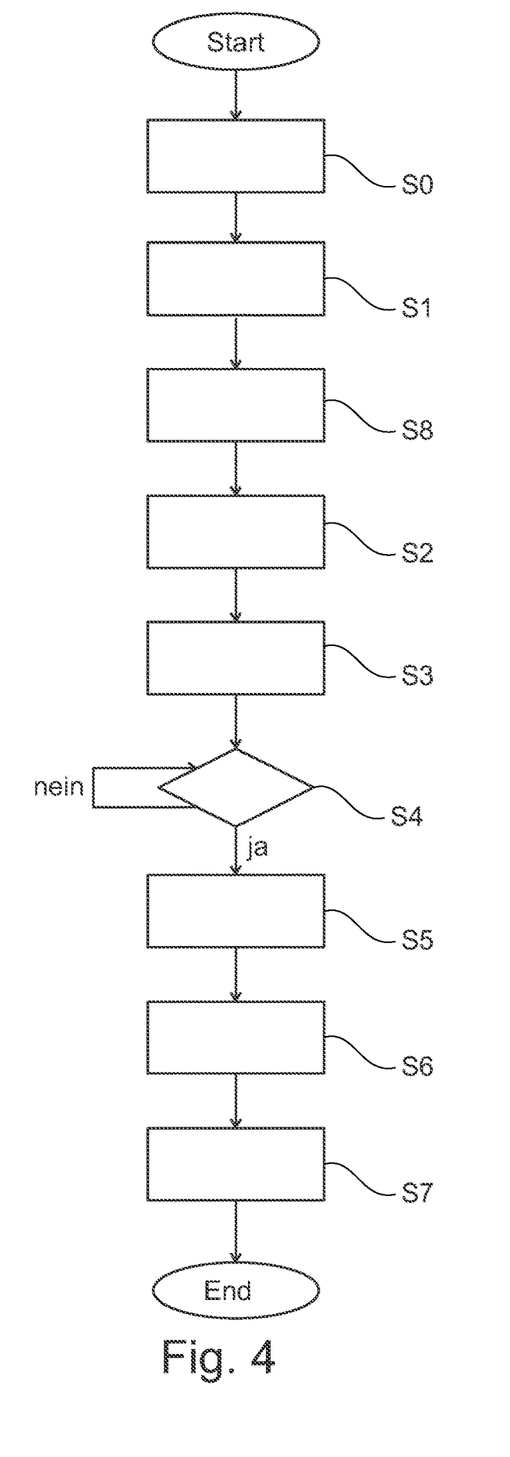
FIG. 4 shows a flow chart of a further exemplary method.

FIG. 4 shows a flow chart of one further exemplary method. In contrast to the method explained with reference to FIG. 3, an additional step S0 is added upstream from the step S1. In the step S0, a vehicle function sequence is recorded by means of the recording unit 12.

After the step S1, an additional step S8 is added, in which vehicle function sequence schemas 7 of different abstraction layers are standardized by means of the standardization unit 11.

| List of reference numerals | |
|---|---|
| 1 | system |
| 2 | vehicle |
| 3 | receiving unit |
| 4 | checking unit |
| 5 | memory unit |
| 6 | control unit |
| 7 | vehicle function sequence schema |
| 8, 8a, 8b, 8c | control signal |
| 9, 9a, 9b, 9c | vehicle function unit |
| 10 | user interface |
| 11 | standardization unit |
| 12 | recording unit |
| 13 | sensor |
| 14 | sensor signal |
| S0 to S8 | method steps |

The invention claimed is:

1. A system, comprising:
   a receiving unit for receiving vehicle function sequence schemas that specify a sequence of vehicle functions upon a triggering event linked to one of the vehicle function sequence schemas;
   a checking unit for checking the received vehicle function sequence schemas;
   a memory unit for storing the checked vehicle function sequence schemas; and
   a control unit for:
   detecting the triggering event,
   selecting a stored vehicle function sequence schema linked to the triggering event,
   generating control signals for controlling vehicle function units according to the selected vehicle function sequence schema, and
   outputting the generated control signals to the vehicle function units.

2. The system of claim 1, wherein the checking unit is further configured for checking the vehicle function sequence schemas with regard to compliance with one or more pre-specified criteria.

3. The system of claim 1, further comprising:
user interfaces coupleable to the receiving unit in a signal-transmitting manner and configured for pre-defining vehicle function sequence schemas and triggering events linked thereto.

4. The system of claim 3, wherein the user interface includes at least one of a graphical user interface, command lines, a natural user interface, a voice user interface, or a character user interface.

5. The system of claim 1, further comprising:
a standardization unit for standardizing vehicle function sequence schemas of different abstraction layers or different sources.

6. The system of claim 1, further comprising:
a recording unit coupleable to one or both of the receiving unit or a user interface in a signal-transmitting manner, and configured for recording a vehicle function sequence.

7. The system of claim 6, wherein the recording unit is configured for detecting the triggering event linked to the vehicle function sequence.

8. A method, comprising:
receiving vehicle function sequence schemas that specify a sequence of vehicle functions upon a triggering event linked to one of the vehicle function sequence schemas;
checking the received vehicle function sequence schemas;
storing the checked vehicle function sequence schemas;
detecting a triggering event;
upon detecting the triggering event, selecting a stored vehicle function sequence schema linked to the triggering event;
generating control signals for controlling vehicle function devices according to the selected vehicle function sequence schema; and
outputting the generated control signals to the vehicle function devices.

9. The method of claim 8, further comprising standardizing vehicle function sequence schemas of different abstraction layers.

10. The method of claim 8, further comprising recording a vehicle function sequence.

11. A computing device comprising a processor and a memory, the memory storing instructions executable by the processor to:
receive vehicle function sequence schemas that specify a sequence of vehicle functions upon a triggering event linked to one of the vehicle function sequence schemas;
check the received vehicle function sequence schemas;
store the checked vehicle function sequence schemas;
detect a triggering event;
upon detecting the triggering event, select a stored vehicle function sequence schema linked to the triggering event;
generate control signals for controlling vehicle function devices according to the selected vehicle function sequence schema; and
output the generated control signals to the vehicle function devices.

12. The computing device of claim 11, wherein vehicle function sequence schemas of different abstraction layers are standardized.

13. The computing device of claim 11, wherein the instructions further include instructions to record a vehicle function sequence.

* * * * *